US008109527B2

(12) United States Patent
Bustle et al.

(10) Patent No.: US 8,109,527 B2

(45) Date of Patent: Feb. 7, 2012

(54) MEDICAL CART AND KEYBOARD TRAY

(75) Inventors: Benjamin Shane Bustle, Charlotte, NC (US); Jacob Connelly, Concord, NC (US); Chad M. Holzshu, Huntersville, NC (US); Robert Grant McRorie, Huntersville, NC (US)

(73) Assignee: Rubbermaid, Inc., Huntersville, NC (US)

( * ) Notice: Subject to any disclaimer, the term of this patent is extended or adjusted under 35 U.S.C. 154(b) by 273 days.

(21) Appl. No.: 12/389,716

(22) Filed: Feb. 20, 2009

(65) Prior Publication Data

US 2009/0212518 A1 Aug. 27, 2009

Related U.S. Application Data

(60) Provisional application No. 61/064,202, filed on Feb. 21, 2008.

(51) Int. Cl.
*B62B 3/02* (2006.01)

(52) U.S. Cl. .............. 280/47.35; 248/118.3; 248/281.11

(58) Field of Classification Search ............... 280/47.34, 280/47.35, 79.11; 248/118.3, 129, 279.1, 248/281.11

See application file for complete search history.

(56) References Cited

U.S. PATENT DOCUMENTS

| | | | | |
|---|---|---|---|---|
| 4,616,798 | A * | 10/1986 | Smeenge et al. | 248/281.11 |
| 5,655,743 | A * | 8/1997 | Gillis | 248/346.01 |
| 5,738,316 | A | 4/1998 | Sweere et al. | |
| 5,842,672 | A | 12/1998 | Sweere et al. | |
| 5,848,773 | A * | 12/1998 | Bourassa | 248/298.1 |
| 5,918,841 | A | 7/1999 | Sweere et al. | |
| 5,967,479 | A | 10/1999 | Sweere et al. | |
| 5,992,809 | A | 11/1999 | Sweere et al. | |
| 6,098,935 | A * | 8/2000 | Kaplan et al. | 248/118.1 |
| 6,883,764 | B1 | 4/2005 | Mileos et al. | |
| 7,004,438 | B2 * | 2/2006 | Lin | 248/289.11 |
| 7,147,190 | B2 | 12/2006 | Welles et al. | |
| 7,188,813 | B2 * | 3/2007 | Kollar | 248/279.1 |
| 7,303,173 | B2 | 12/2007 | Mileos | |
| 7,481,170 | B2 | 1/2009 | Sommerfield | |
| 7,487,940 | B2 | 2/2009 | Saez et al. | |
| 7,523,905 | B2 | 4/2009 | Timm et al. | |
| 7,828,253 | B2 * | 11/2010 | Meyer | 248/129 |
| 2005/0288571 | A1 * | 12/2005 | Perkins et al. | 600/407 |

* cited by examiner

*Primary Examiner* — John Walters

(74) *Attorney, Agent, or Firm* — Dennis J. Williamson; Moore & Van Allen, PLLC

(57) ABSTRACT

A medical cart comprising a base is supported on wheels. A first arm is supported on a track for linear movement in a first direction that supports a first platform. The arm also supports a second platform that is mounted for linear movement in a second direction substantially perpendicular to the first direction. The first platform is mounted on a tilt assembly such that the angle of the first platform relative to the second platform can be adjusted.

16 Claims, 10 Drawing Sheets

MEDICAL CART AND KEYBOARD TRAY

This application claims benefit of priority under 35 U.S.C. §119(e) to the filing date of to U.S. Provisional Application No. 61/064,202 as filed on Feb. 21, 2008, which is incorporated herein by reference in its entirety.

FIELD OF THE INVENTION

The invention relates to a keyboard tray and more specifically to a keyboard tray particularly suited for use in medical carts.

BACKGROUND

Mobile medical carts are typically used in institutional applications for medication delivery, information processing or the like where the carts may be moved to the point of service delivery such as a patient room in a hospital. Such medical carts typically include a monitor, processor and user interface to allow the medical personnel to access data from and input data to a system. The carts also include storage for medical equipment, medications and the like.

SUMMARY OF THE INVENTION

A medical cart comprises a base supported on wheels. At least a first arm is supported on a first track for linear movement in a first direction. The first arm supports a first platform and a second platform that is mounted for linear movement in a second direction substantially perpendicular to the first direction. The first platform is mounted on a tilt mechanism such that the angle of the first platform relative to the second platform can be adjusted. The first platform is rotatably mounted on a first axle. A slide plate is mounted to the underside of the first platform such that it can slide relative to the first platform. The slide plate includes a first series of teeth and defines a slot that extends at an angle relative to the direction of sliding motion of slide plate. A second axle extends through the slot that that forces the slide plate to slide when the platform is pivoted about the first axle. A locking member is mounted to the platform that is formed with a second series of teeth that releasably engage said first series of teeth to selectively lock the sliding plate in position relative to said platform.

DETAILED DESCRIPTION OF EMBODIMENTS OF THE INVENTION

Figure 1:
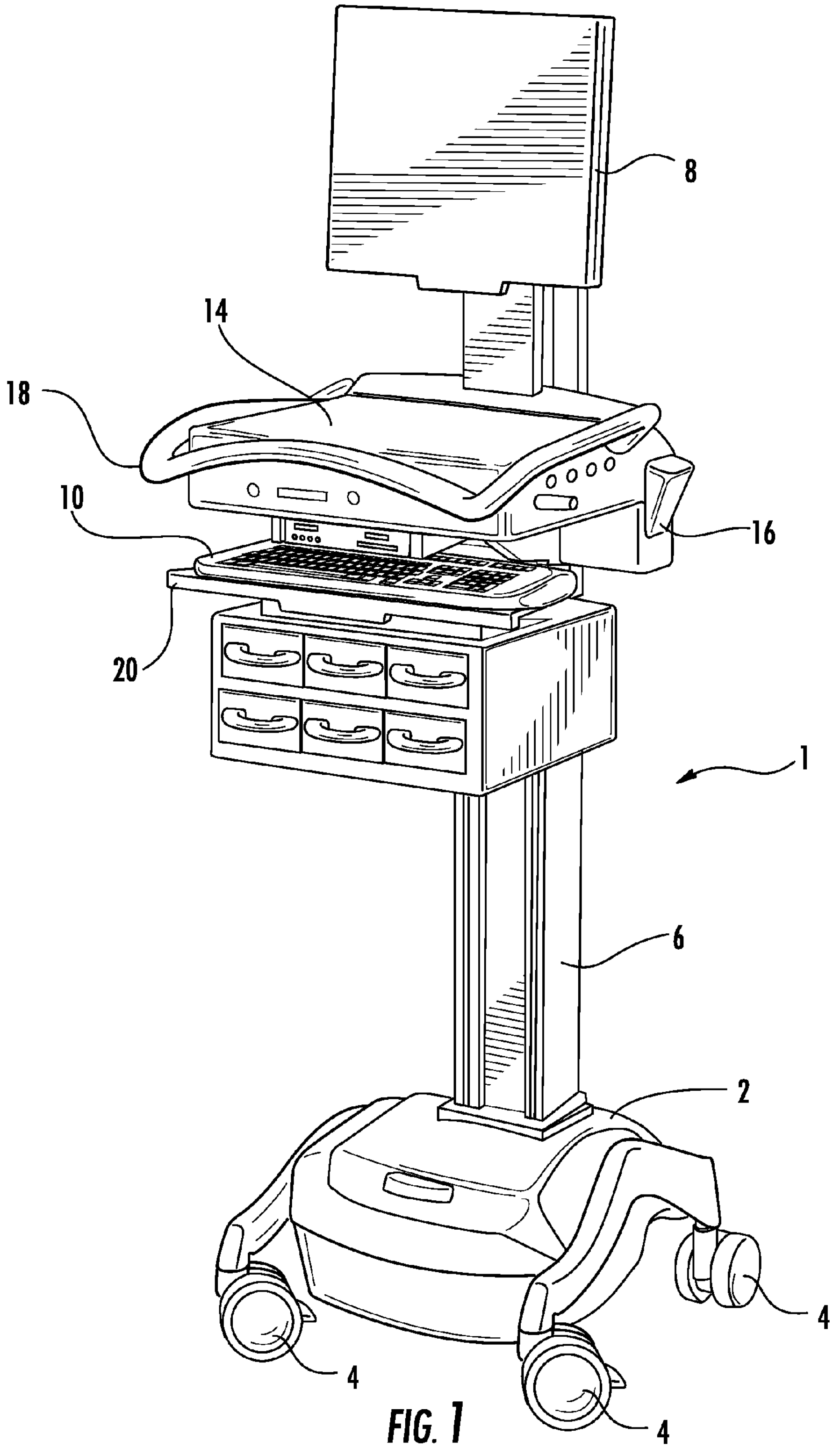
FIG. 1 is a perspective view showing an exemplary medical cart on which the keyboard tray of the invention may be used.

Referring to FIG. 1 an exemplary medical cart in which the keyboard tray assembly of the invention may be used is shown generally at 1. While a particular embodiment of a medical cart is shown it is to be understood that the keyboard tray of the assembly may be used with other carts and may be used in any application where a keyboard tray is useful. The cart 1 comprises a base 2 supported on wheels 4 such that the cart can be rolled on a floor. The cart 1 may be pushed or pulled by medical personnel to move the cart to various points of service such as between patient rooms in an institutional setting. The base 2 may provide an internal storage compartment for holding a power module such as a rechargeable battery. Supported on base 2 is a vertically extending support structure such as tower 6 that supports the other cart components such as a monitor 8, a user input device such as a keyboard and mouse 10, a work platform 14 and storage bins 16. The keyboard and mouse may be supported on keyboard tray 20. These components may be movably mounted on the tower 6 such that the height of the components is adjustable. The work platform 14 may also include an internal storage compartment for supporting a computer such as a PC, wireless communications systems to communicate with a wider network system, a system controller and/or other systems. A handle 18 may be provided to facilitate the pushing and pulling of the cart 1.

Figure 4:
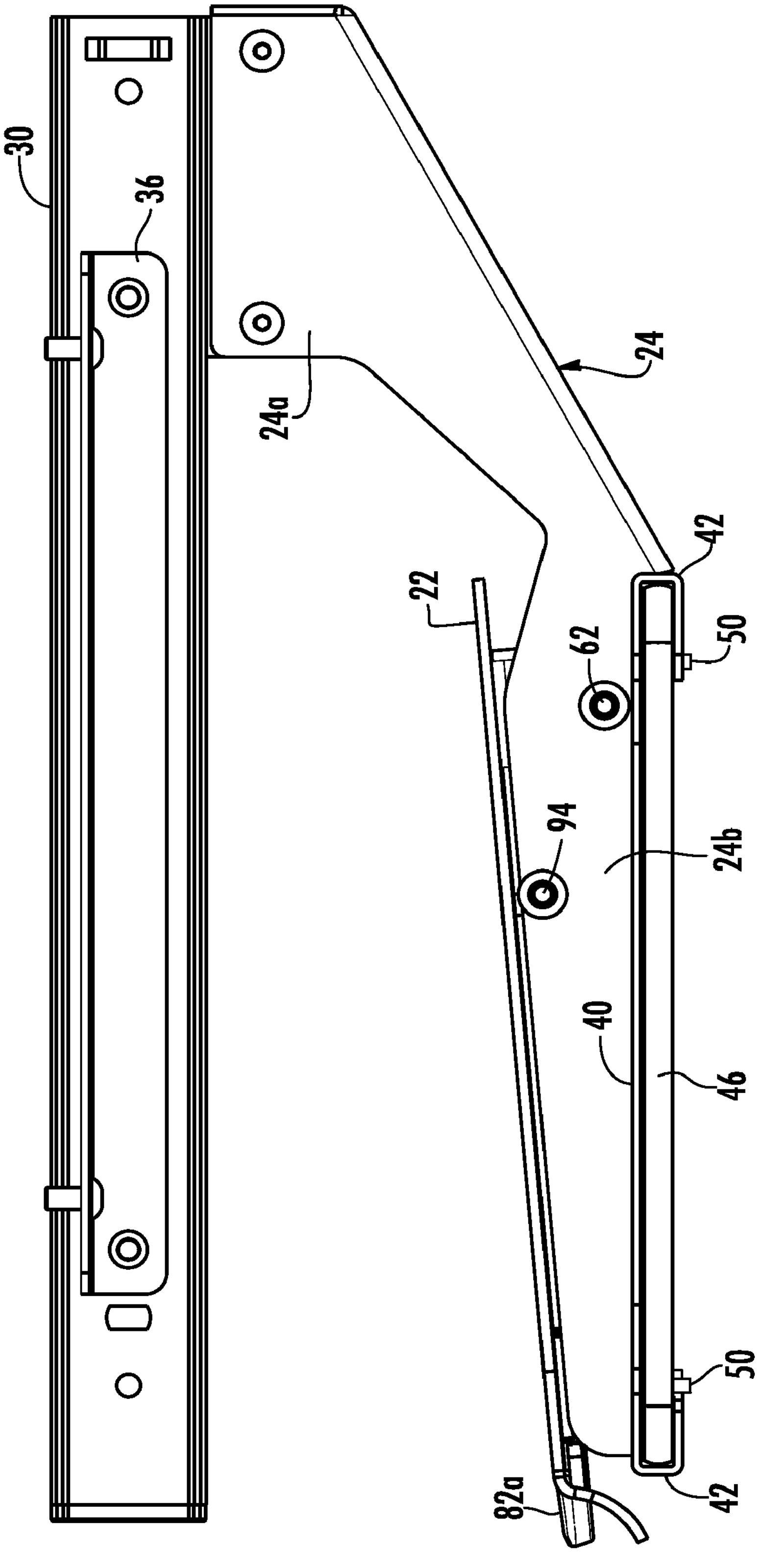
FIG. 4 is a side view showing the keyboard tray in the retracted position.
Figure 5:
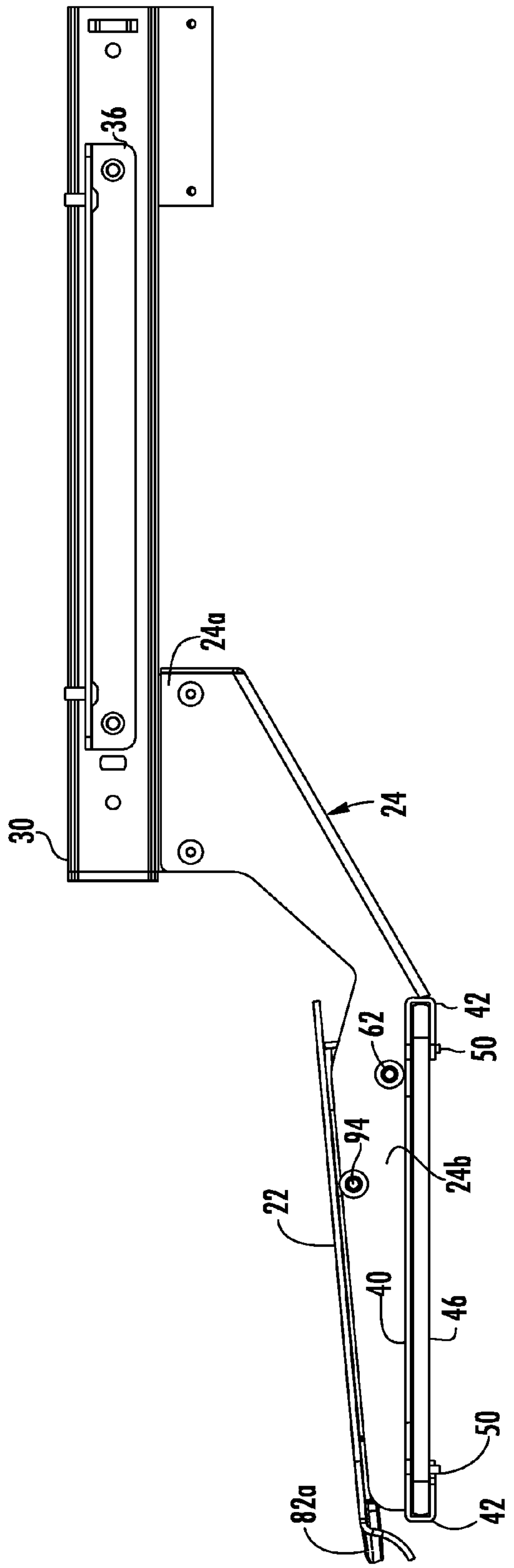
FIG. 5 is a side view showing the keyboard tray in the extended position.

The keyboard tray 20 has a primary support surface 22. Primary support surface 22 may be used to support a keyboard. Primary support surface 22 is connected to first and second support arms 24 as will hereinafter be described. Each support arm 24 has a first end 24*a* that is supported from a plate 26. Each plate is connected to a runner 28 that is supported in a horizontally extending track 30 such that the runner 28 can slide in the track 30 to move the tray horizontally from a retracted position (FIG. 4) to an extended position (FIG. 5). Each track 30 includes vertically spaced channels 32 and 34 that extend for substantially the length of the tracks 30. Each runner 28 includes a first flange 28*a* that extends into the upper channel 32 and a second flange 28*b* that extends into the lower channel 34. The flanges 28*a* and 28*b* slide in the channels 32 and 34 to allow the runners to move horizontally in the tracks 30. Bearings or other devices may be used to minimize the friction between the runners 28 and the tracks 30.

The tracks 30 are supported in a substantially horizontal orientation by brackets 36 that connect the tracks 30 to a housing 38. Housing 38 may be mounted to cart 2 with the tracks 30 mounted to the housing 38. Tracks 30 may also be mounted directly to other cart structure. In one embodiment brackets 32 are L-brackets having a first leg mounted to the side of tracks 30 and a second leg mounted to the housing 38 using screws or other fasteners.

Each support arm 24 has a second end 24*b* that extends below and towards the front of the tracks 30 such that the primary support surface 22 is located below the tracks 30 a sufficient distance to allow a keyboard and/or other devices to be supported on surface 22 and fit beneath the tracks 30 when the arms are in the retracted position. The arms 24 support a plate 40 that extends between the arms 24 and is disposed substantially horizontally. Plate 40 supports a secondary support 46 surface as will hereinafter be described.

Figure 3:
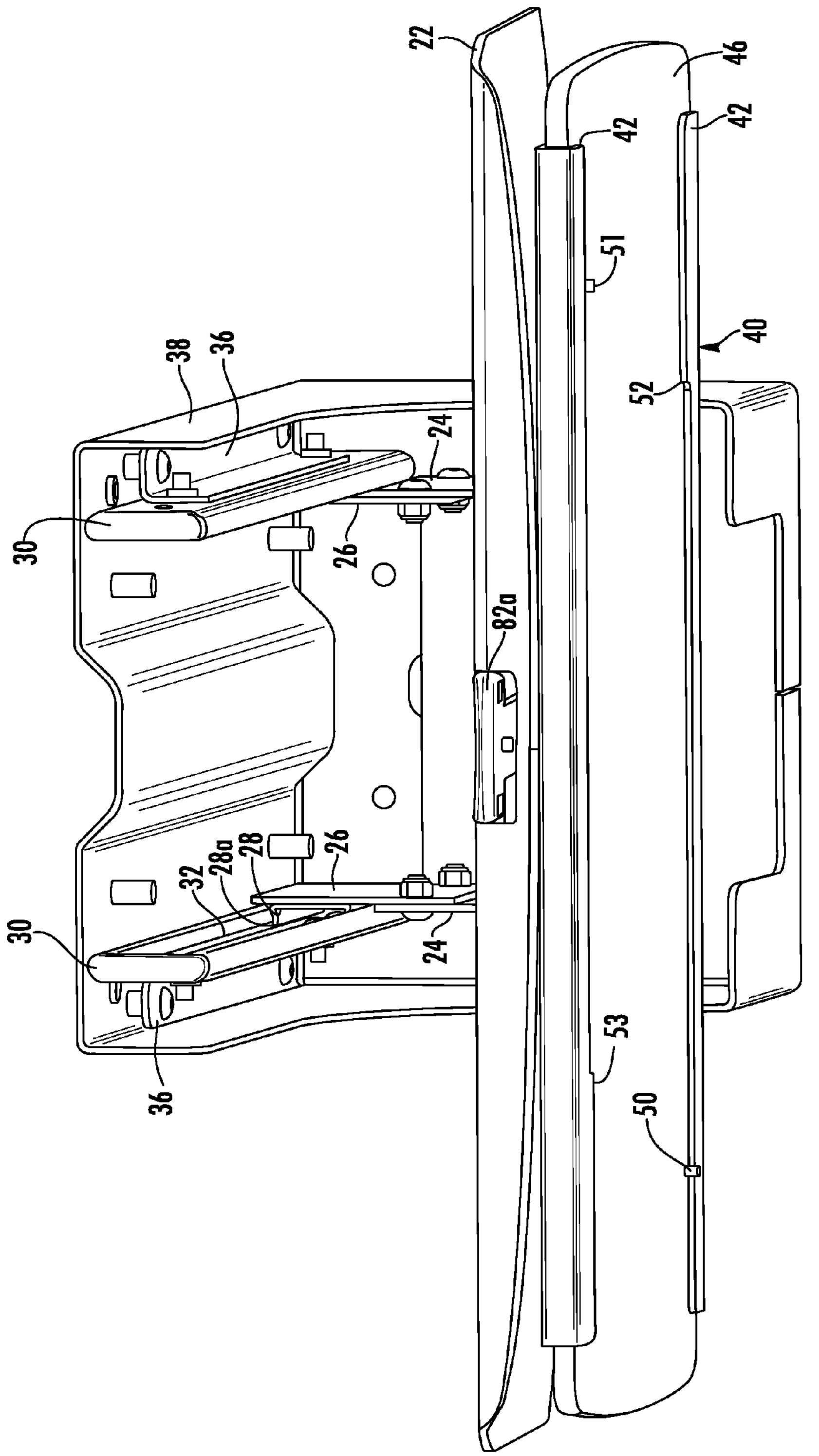
FIG. 3 is another perspective front view of the keyboard tray of FIG. 2.

The plate 40 is formed with two parallel tracks 42 that extend the length of plate 40 and are arranged substantially perpendicular to the direction of tracks 30. In the illustrated embodiment tracks 42 are formed as bent portions of plate 40 that form C-shaped channels that are dimensioned to closely but slidably receive the secondary work platform 46. The tracks 42 may also be formed of separate C-shaped channels secured to the bottom of arms 24. The channels are spaced from one another and cooperate to hold secondary work platform 46 therebetween. The secondary work platform 46 can be slid in the tracks 42 so as to extend from either side of the plate 40. When extended, the secondary work 46 surface extends beyond either end of the primary work platform 22 to create additional work or support surfaces. The secondary work platform 46 can be used to support a mouse or other user input device or to support other materials including paper, documentation or other medical equipment. The secondary work platform 46 is dimensioned to be substantially coextensive with the primary work platform 22 such that when it is extended it effectively doubles the work area available to the user. Moreover, because the secondary work platform 46 is operated independently of the primary work platform 22 it can be maintained in a substantially horizontal position even if the angular position of the primary work platform 22 is adjusted. Pins 50, 51 extend from the bottom of the secondary work platform 46 that engage cooperating surfaces 52, 53 on the tracks 42 that act as stops to prevent the secondary work platform 46 from being pulled completely out of the tracks 42. When the secondary work platform is slid to the right as viewed in FIG. 3 pin 50 engages surface 52. Likewise, when the secondary work platform is slid to the left as viewed in FIG. 3 pin 51 engages surface 53.

The primary work platform 22 is mounted on a tilt assembly 60 such that the angle of the primary work platform 22 relative to the secondary work platform 46, and to horizontal, can be adjusted to allow the user to find a comfortable position for the primary work platform and a keyboard supported by the platform. Primary work platform 22 is pivotably mounted to support arms 24 on axle 62 such that it can pivot about axis A-A from the raised position shown in FIGS. 6 and 7 to the lowered position shown in FIGS. 8 and 9. In one embodiment platform 22 is formed with downturned flanges 64 that are rotatably mounted on axle 62. Axle 62 may be replaced by other mounting mechanisms such as two pivot piuns one supporting each side of platform 22.

A slide plate 66 is mounted to the underside of platform 22 such that it can slide relative to the platform 22 in the direction of arrow A. Slide plate 66 is formed with slots 68 that receive fasteners 70. Fasteners 70 extend through slots 68 and are fixed to platform 22 such that the head 74 traps the underside of slide plate 66 allowing plate 66 to slide relative to the platform 22. Plate 66 includes a cut-out portion or recess 69 having a series of teeth 71 formed along at least one edge thereof. In the illustrated embodiment the teeth 71 are formed along both sides of the recess 69 extending along the sliding direction A of plate 66.

The slide plate 66 includes downwardly extending flanges 90 that are formed with slots 92. Slots 92 extend at and angle to the direction of sliding motion of slide plate 66 and receive a rod 94 that extends between and is mounted to support arms 24. Rod 94 acts as a camming surface that forces the slide plate 66 to slide in the direction of arrow A when the platform 22 is pivoted about axle 62 as will hereinafter be described. Rod 94 may be replaced by camming pins one fixed to each of arms 24 and extending into the adjacent slot 92.

A locking member 76 is also mounted to the underside of platform 22. The locking member includes a resilient spring member 78 that is fixed to the underside of platform 22 by fasteners 80. A rigid lock 82 is attached to the end of resilient member 78 such that the resilient member 78 biases the lock 82 into cut-out portion 69. The lock 82 is formed with teeth 84 that engage teeth formed on the plate 66 to lock the plate 66 in position relative to platform 22. The lock 82 is formed with a push button area **82*a* that can be depressed by a user to deform resilient member 78 and force lock 82 below and out of engagement with teeth 71. When the lock is depressed the slide plate 66 can be slid relative to platform 22 in the direction of arrow A. When the user releases the lock 82, resilient member 78 returns to its undeformed state and forces lock 82 upwards back into slot 69 such that teeth 84 again engage teeth 71**.

Figure 2:
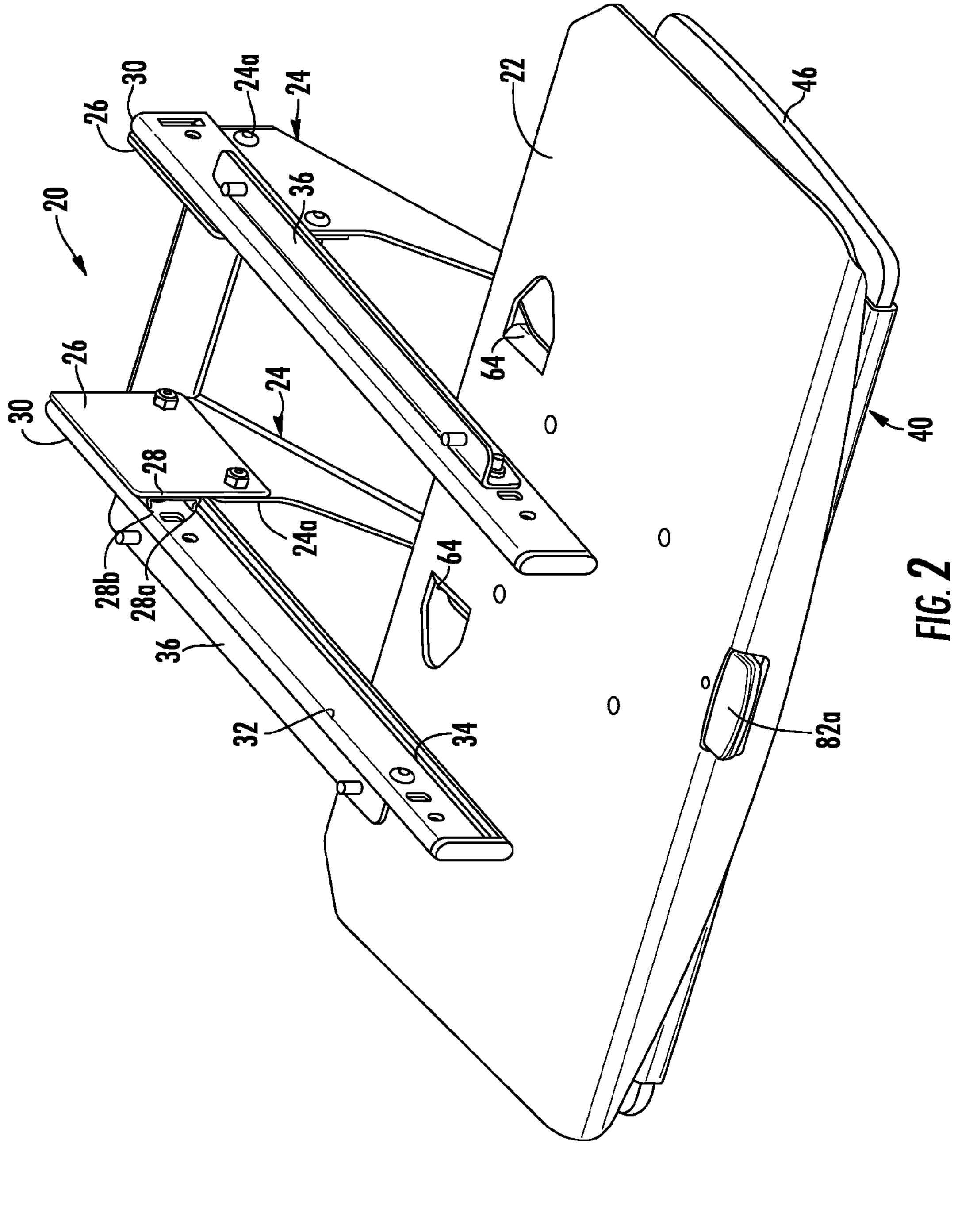
FIG. 2 is a perspective front view of the keyboard tray.

The operation of the tilt mechanism will now be described. Assume that the primary platform 22 is in the lowered position shown in FIGS. 2, 8 and 9 where the front of the primary platform is tilted down about axle 62 and axis A-A, rod 94 is located in the front of slots 92 and teeth 84 of lock 82 are engaged with teeth 71 of plate 66. To raise the platform, the user unlocks the platform by depressing button **82*a* to flex resilient member 78 and disengage teeth 84 from teeth 71**.

Figure 6:
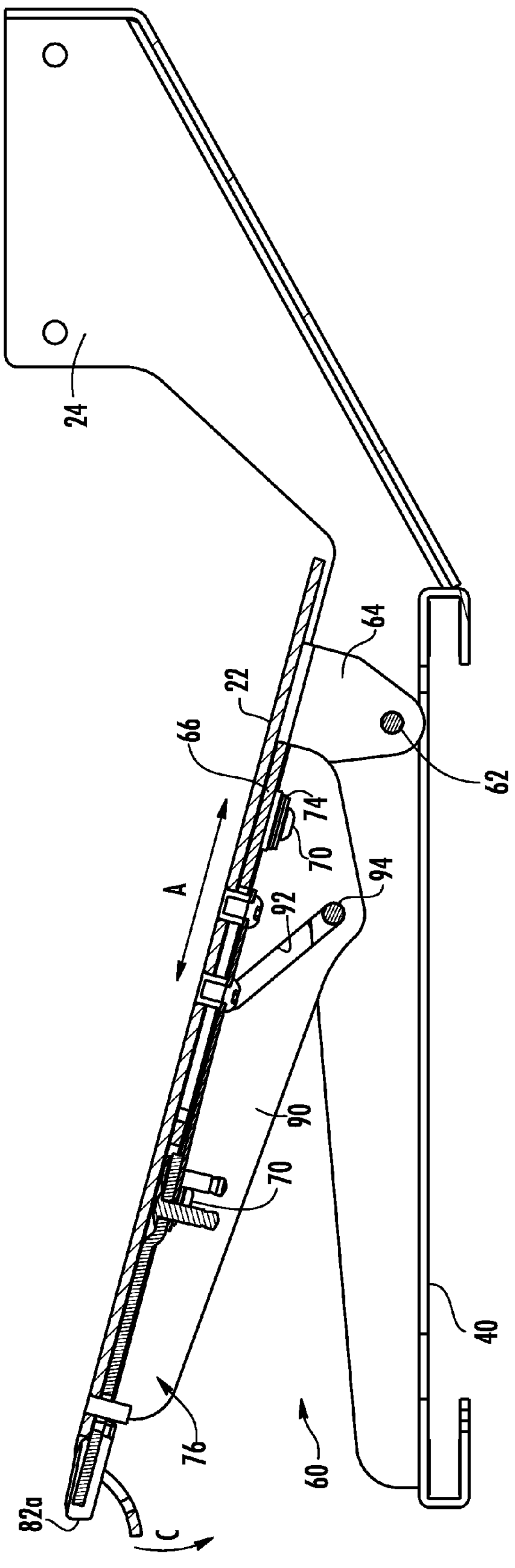
FIG. 6 is a section view showing the tilt mechanism in a raised position.
Figure 7:
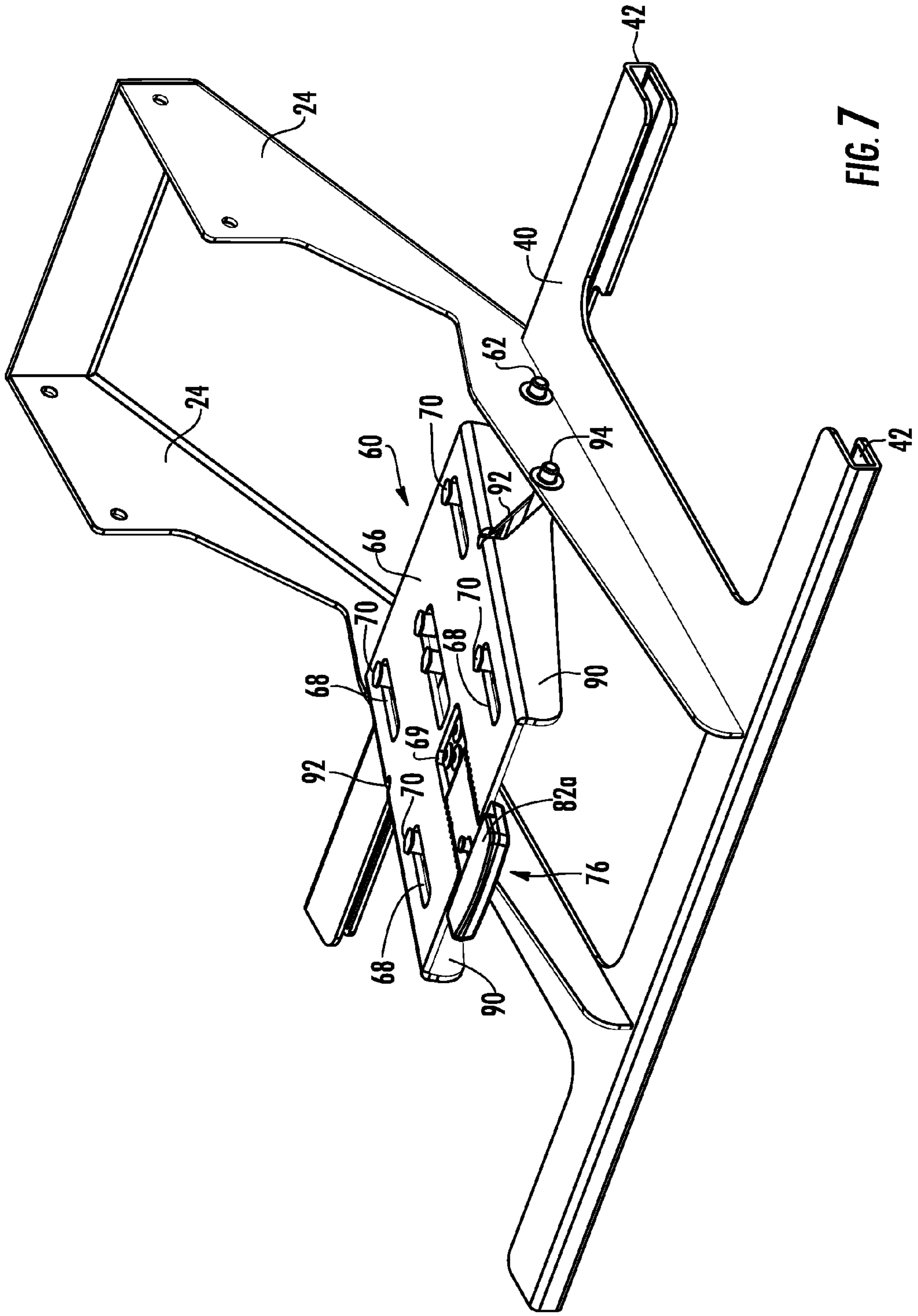
FIG. 7 is a perspective view showing the tilt mechanism in a raised position.

The user then pushes up on the front end of the platform 22 in the direction of arrow B to rotate the platform 22 about axis A-A. As the platform 22 rotates, slots 92 ride over rod 94. Because of the angle of slots 92 the slide plate 66 is pushed toward the front of platform 22 as shown in FIG. 6. Once the platform is positioned in the desired raised position, the lock 82 is released such that teeth 84 engage teeth 71. Once the teeth are engaged, the position of the slide plate 66 is fixed relative to the axle 62. Because slide plate 66 is locked in position, it cannot move relative to rod 94 thereby preventing the platform 22 from rotating on axle 62 effectively locking the platform in position.

Figure 8:
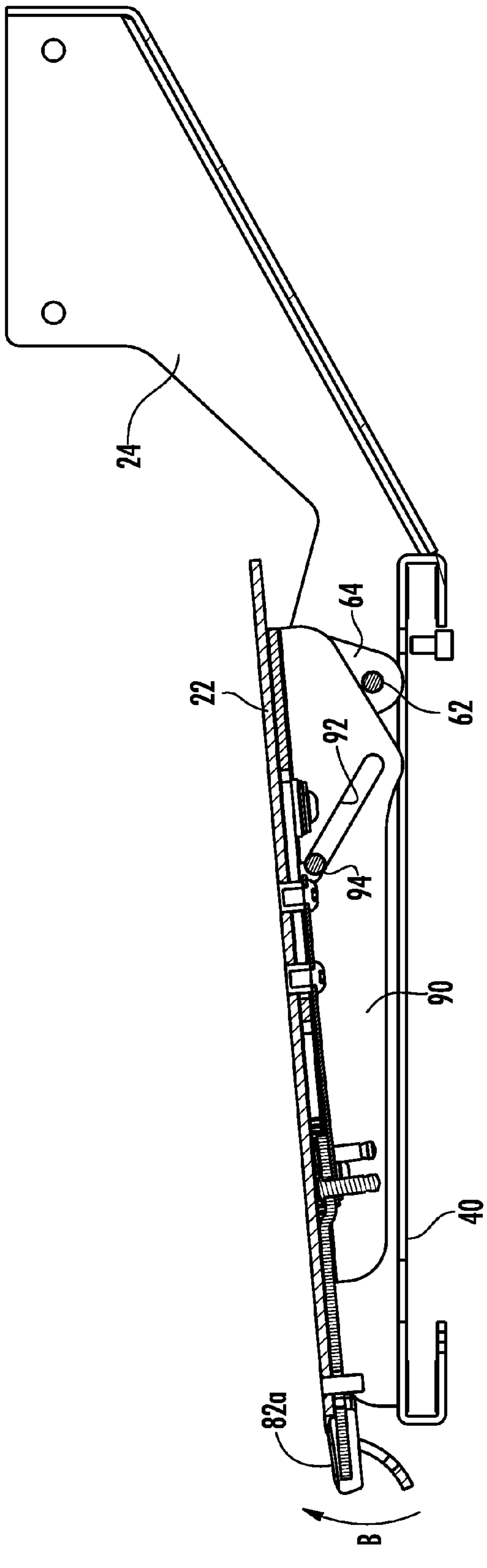
FIG. 8 is a section view showing the tilt mechanism in a lowered position.
Figure 9:
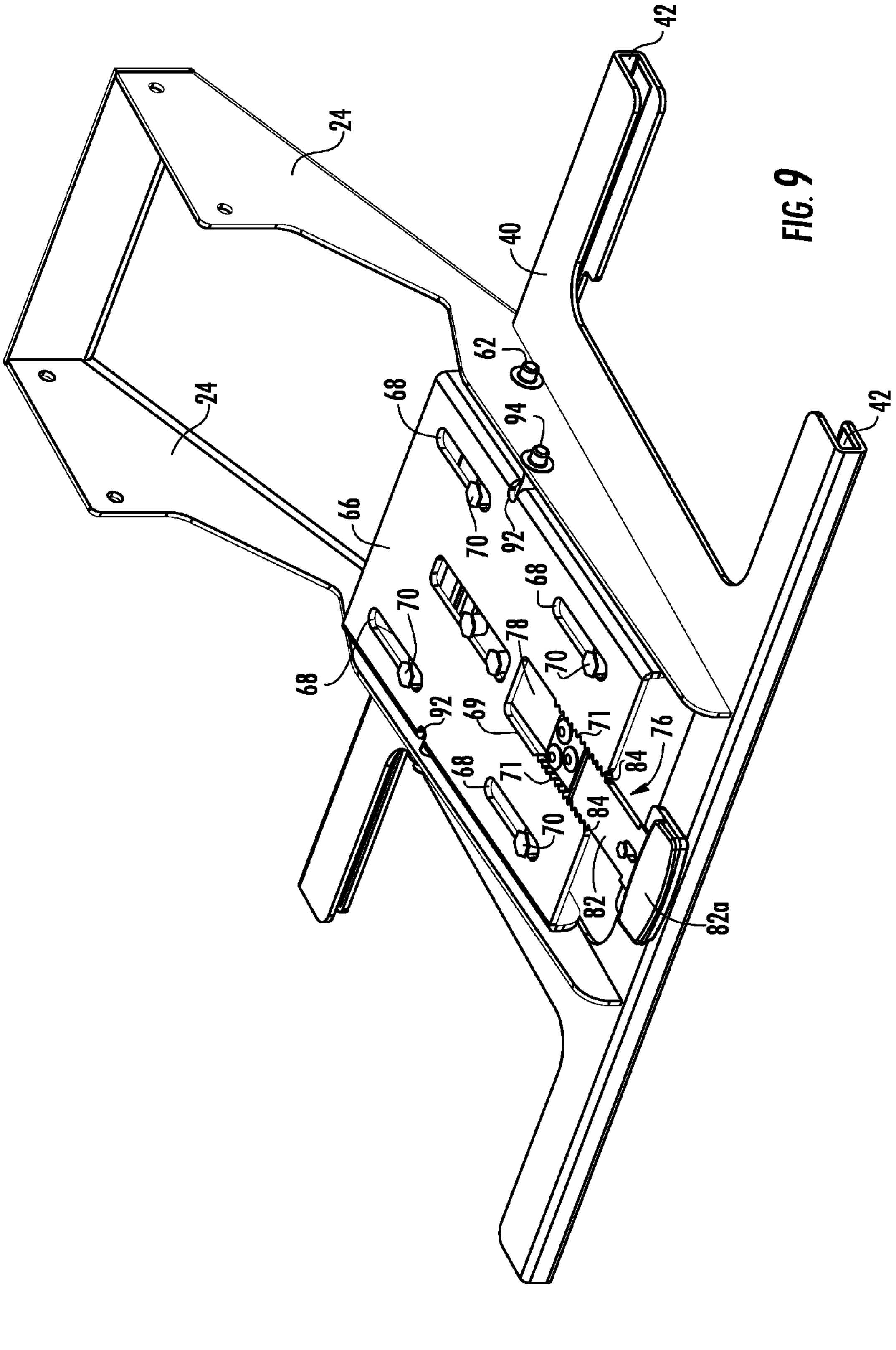
FIG. 9 is a perspective view showing the tilt mechanism in a lowered position.
Figure 10:
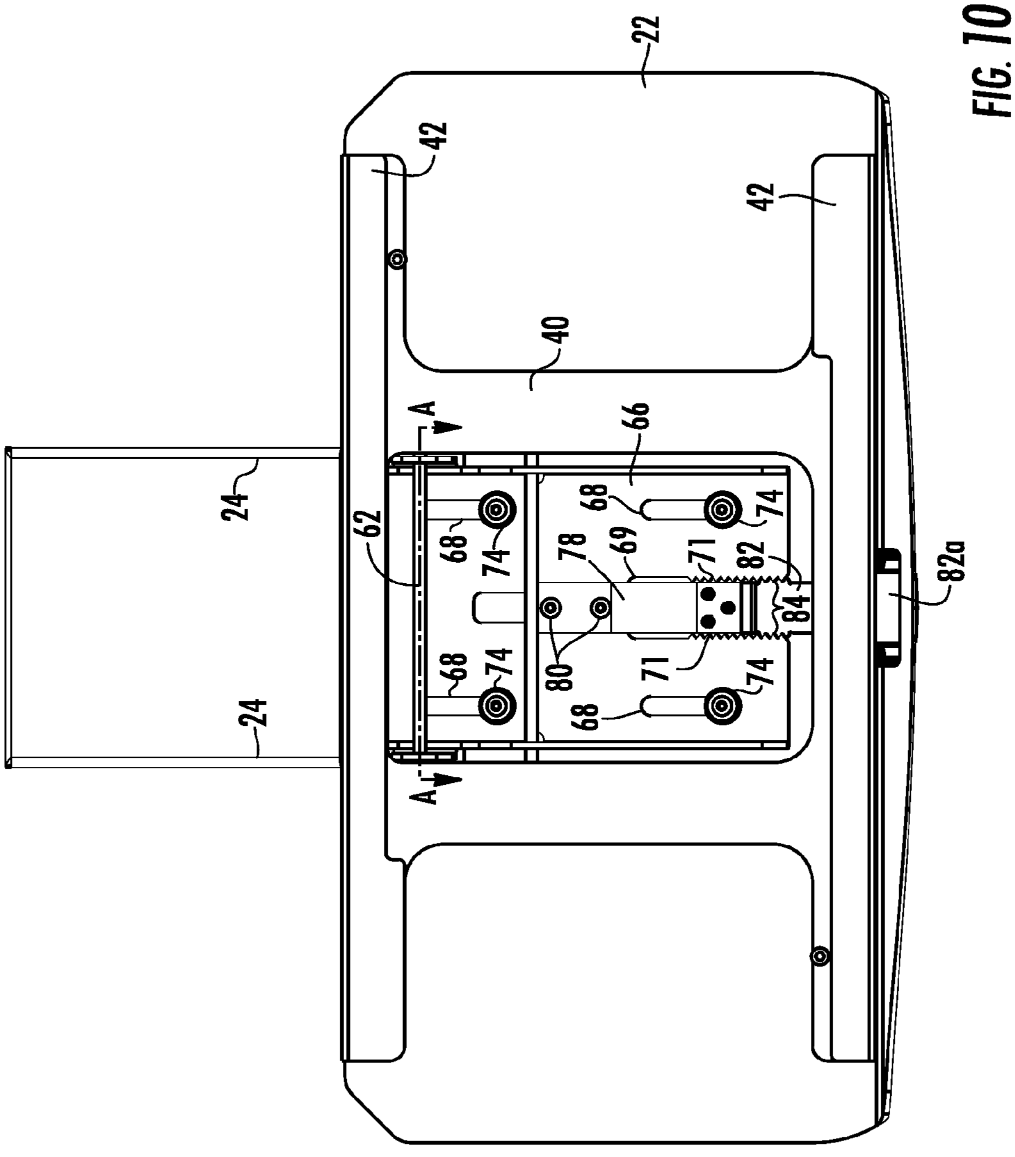
FIG. 10 is a bottom view of the keyboard tray.

To lower the platform 22, the user unlocks the platform by depressing lock 82 to flex resilient member 78 and disengage teeth 84 from teeth 71. The user then pushes down on the end of the platform 22 in the direction of arrow C to rotate the platform 22 about axis A-A. As the platform 22 rotates, slots 92 ride over rod 94. Because of the angle of slots 92 the slide plate 66 is pushed toward the rear of platform 22 as shown in FIG. 8. Once the platform 22 is positioned in the desired lowered position, the lock 82 is released such that teeth 84 engage teeth 71. Once the teeth are engaged, the position of the slide plate 66 is fixed relative to the axle 62. Because slide plate 66 is locked in position, it cannot move relative to rod 94 thereby preventing the platform 22 from rotating on axle 62 effectively locking the platform in position. The platform can be locked in any position between the raised position of FIGS. 6 and 7 and the lowered position of FIGS. 8 and 9.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A cart comprising:

a base supported on wheels and having a support structure;

a first track supported by the support structure;

at least a first arm supported on said first track for linear movement in a first direction;

said first arm supporting a first platform, said first platform being pivotable between a first position and a second position about a first axis;

said first arm supporting a second platform, said second platform mounted for linear movement in a second direction disposed substantially perpendicular to said first direction wherein said first platform is mounted on a tilt assembly such that the angle of the first platform relative to the second platform can be adjusted.

2. The cart of claim 1 further including a second track supported by said support structure and a second arm supported on said second track.

3. The cart of claim 1 wherein said second platform is arranged below said first platform.

4. The cart of claim 1 wherein said second platform is substantially coextensive with the first platform.

5. The cart of claim 1 wherein said second platform is mounted in a second track.

6. The cart of claim 1 wherein the first platform is pivotably mounted to said first arm such that the first platform is pivotable between a raised position and a lowered position.

7. The cart of claim 1 wherein the first platform is formed with flanges that are rotatably mounted on a first axle.

8. The cart of claim 1 further including a slide plate mounted to an underside of the first platform such that the slide plate can slide relative to the first platform.

9. The cart of claim 8 wherein said slide plate is formed with slots that receive fasteners that are fixed to the first platform.

10. The cart of claim 8 wherein said slide plate includes a recess having a first series of teeth formed along one edge thereof.

11. The cart of claim 10 further including a lock mounted to the first platform, said lock being formed with a second series of teeth that engage said first series of teeth formed on said sliding plate to lock the sliding plate in position relative to said first platform.

12. The cart of claim 11 wherein said lock includes a resilient member fixed to the first platform, said resilient member biasing the first series of teeth into engagement with the second series of teeth.

13. The cart of claim 12 wherein said lock includes a button that can be depressed by a user to deform the resilient member to disengage said first series of teeth from said second series of teeth.

14. The cart of claim 8 wherein the slide plate includes a slot that extends at an angle relative to the direction of sliding motion of slide plate.

15. The cart of claim 14 wherein said slot receives a rod that that forces the slide plate to slide when the platform is pivoted about said first axis.

16. A cart comprising:

a base supported on wheels and a support structure on said base;

a first track supported by said support structure;

at least a first arm supported on said first track for linear movement in a first direction;

said first arm supporting a first platform;

said first arm supporting a second platform, said second platform mounted for linear movement in a second direction disposed substantially perpendicular to said first direction;

said first platform rotatably mounted on a first axis such that the angle of the first platform relative to the second platform can be adjusted;

a slide plate mounted to an underside of the first platform such that the slide plate can slide relative to the first platform, said slide plate including a first series of teeth and defining a slot that extends at an angle relative to the direction of sliding motion of slide plate;

a rod extending through said slot that that moves the slide plate when the platform is pivoted about said first axis; and a locking member mounted to the platform, said locking member being formed with a second series of teeth that engage said first series of teeth to lock the sliding plate in position relative to said platform.

* * * * *